US010230090B2

(12) United States Patent
Lee et al.

(10) Patent No.: US 10,230,090 B2
(45) Date of Patent: Mar. 12, 2019

(54) SEPARATOR, METHOD OF MANUFACTURING THE SAME AND BATTERY USING THE SAME

(71) Applicant: SAMSUNG SDI CO., LTD., Yongin-si, Gyeonggi-do (KR)

(72) Inventors: Sang Ho Lee, Suwon-si (KR); Kee Wook Kim, Suwon-si (KR); Yun Gi Kim, Suwon-si (KR); Jung Seong Lee, Suwon-si (KR); Jung Sue Jang, Suwon-si (KR); Jun Ho Chung, Suwon-si (KR); Jae Hyun Cho, Suwon-si (KR); Dae Hyun Hong, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 59 days.

(21) Appl. No.: 14/745,608

(22) Filed: Jun. 22, 2015

(65) Prior Publication Data

US 2015/0372275 A1 Dec. 24, 2015

(30) Foreign Application Priority Data

Jun. 24, 2014 (KR) .................. 10-2014-0077446

(51) Int. Cl.
| | |
|---|---|
| *H01M 2/16* | (2006.01) |
| *H01M 2/14* | (2006.01) |
| *B29C 47/06* | (2006.01) |
| *B29C 47/00* | (2006.01) |
| *B29C 47/92* | (2006.01) |
| *B29K 23/00* | (2006.01) |
| *B29K 105/04* | (2006.01) |
| *B29L 31/34* | (2006.01) |
| *B29L 9/00* | (2006.01) |
| *H01M 10/052* | (2010.01) |
| *B29C 47/14* | (2006.01) |
| *B29C 47/36* | (2006.01) |
| *B29C 47/68* | (2006.01) |
| *B29C 47/88* | (2006.01) |

(52) U.S. Cl.
CPC ....... *H01M 2/1686* (2013.01); *B29C 47/0021* (2013.01); *B29C 47/0057* (2013.01); *B29C 47/065* (2013.01); *B29C 47/92* (2013.01); *H01M 2/145* (2013.01); *H01M 2/166* (2013.01); *H01M 2/1646* (2013.01); *H01M 2/1653* (2013.01); *H01M 2/1666* (2013.01); *B29C 47/145* (2013.01); *B29C 47/364* (2013.01); *B29C 47/68* (2013.01); *B29C 47/8845* (2013.01); *B29C 2947/926* (2013.01); *B29K 2023/00* (2013.01); *B29K 2105/04* (2013.01); *B29L 2009/00* (2013.01); *B29L 2031/3468* (2013.01); *H01M 10/052* (2013.01)

(58) Field of Classification Search
CPC ............. H01M 2/1686; H01M 2/1646; H01M 2/1653; H01M 2/1666
See application file for complete search history.

(56) References Cited

U.S. PATENT DOCUMENTS

| | | | | |
|---|---|---|---|---|
| 2009/0087728 A1* | 4/2009 | Less | ...................... | H01M 2/162 429/129 |
| 2009/0253032 A1* | 10/2009 | Takita | ................... | B29C 55/065 429/145 |
| 2013/0224552 A1* | 8/2013 | Hong | .................. | H01M 2/1686 429/144 |
| 2013/0224555 A1* | 8/2013 | Hong | .................... | H01M 2/166 429/144 |
| 2013/0287937 A1* | 10/2013 | Joo | .................... | B01D 67/0046 427/126.4 |

FOREIGN PATENT DOCUMENTS

| | | |
|---|---|---|
| JP | WO2008-035674 A1 | 3/2008 |
| JP | 2009-266808 A | 11/2009 |
| JP | 4460028 B2 | 5/2010 |
| KR | 10-2008-0063792 A | 7/2008 |
| KR | 10-2009-0023345 A | 3/2009 |
| KR | 10-2009-0075741 A | 7/2009 |
| KR | 10-2009-0130885 A | 12/2009 |
| KR | 10-2011-0087017 A | 8/2011 |
| KR | 10-2011-0114720 A | 10/2011 |
| KR | 10-2012-0025619 A | 3/2012 |
| KR | 10-2012-0043164 A | 5/2012 |
| KR | 10-1243070 B1 | 3/2013 |
| KR | 10-1406051 B1 | 6/2014 |
| WO | WO 2008-035674 A1 | 3/2008 |

OTHER PUBLICATIONS

Korean Office Action dated Feb. 19, 2016 in Corresponding Korean Patent Application No. 10-2014-0077446.

* cited by examiner

*Primary Examiner* — Jonathan G Jelsma
(74) *Attorney, Agent, or Firm* — Lee & Morse, P.C.

(57) ABSTRACT

A polyolefin-based porous separator, including a first polyolefin-based porous film on a first surface of a second polyolefin-based porous film, and a third polyolefin-based porous film on a second surface of the second polyolefin-based porous film, each of the first and third polyolefin-based porous films containing inorganic particles having an average particle size of 10 nm to 100 nm, a thickness ratio of the first polyolefin-based porous film, the second polyolefin-based porous film, and the third polyolefin-based porous film being 0.5 to 1.5:1 to 6:0.5 to 1.5, and thermal shrinkage rates of the separator in a machine direction and a transverse direction measured after standing at 120° C. for 1 hour each being 5% or less, and air permeability of the separator being 250 sec/100 cc or less.

16 Claims, No Drawings

SEPARATOR, METHOD OF MANUFACTURING THE SAME AND BATTERY USING THE SAME

CROSS-REFERENCE TO RELATED APPLICATION

Korean Patent Application No. 10-2014-0077446, filed on Jun. 24, 2014, in the Korean Intellectual Property Office, and entitled: "Separator, Method of Manufacturing the Same and Battery Using the Same," is incorporated by reference herein in its entirety.

BACKGROUND

1. Field

Embodiments relates to a separator, a method of manufacturing the same, and a battery using the same.

2. Description of the Related Art

A separator for an electrochemical battery may be an intermediate film separating a cathode and an anode from each other in a battery and continuously maintaining ion conductivity to enable charge and discharge of the battery. To produce a high capacity battery, while simultaneously providing light weight and miniaturization of an electrochemical battery for improving, for example, portability of electronic devices, shape stability against heat, a thermal shrinkage rate, a shut-down property, and a melt-down property, as well as electrolyte solution permeability, mechanical strength may be required.

SUMMARY

Embodiments may be realized by providing a polyolefin-based porous separator, including a first polyolefin-based porous film on a first surface of a second polyolefin-based porous film, and a third polyolefin-based porous film on a second surface of the second polyolefin-based porous film, each of the first and third polyolefin-based porous films containing inorganic particles having an average particle size of 10 nm to 100 nm, a thickness ratio of the first polyolefin-based porous film, the second polyolefin-based porous film, and the third polyolefin-based porous film being 0.5 to 1.5:1 to 6:0.5 to 1.5, and thermal shrinkage rates of the separator in a machine direction and a transverse direction measured after standing at 120° C. for 1 hour each being 5% or less, and air permeability of the separator being 250 sec/100 cc or less.

Each of the first to third polyolefin-based porous films may include pores caused by stretching.

The first and third polyolefin-based porous films may have a same thickness as each other.

A thickness change T represented by the following Equation 1 may be 20% or less:

$$T(\%)=[T_1-T_2]/T_1 \times 100,\qquad \text{[Equation 1]}$$

wherein $T_1$ is a thickness of the polyolefin-based porous separator before heating and pressing, and $T_2$ is a thickness of the polyolefin-based porous separator after heating and pressing at 90° C. and 2.2 MPa for 5 minutes.

Air permeability measured after heating and pressing the polyolefin-based porous separator at 90° C. and 2.2 MPa for 5 minutes may be 500 sec/100 cc or less.

Tensile strength of the polyolefin-based porous separator in each of the machine direction and the transverse direction may be 900 kgf/cm² or more, and a thermal shrinkage rate measured in each of the machine direction and the transverse direction after standing at 105° C. for 1 hour may be 0.1% or less.

An electrolyte solution absorption amount measured after dipping the polyolefin-based porous separator in an electrolyte solution at 18° C. for 60 minutes may be 300 mg or more per 1 g of the polyolefin-based porous separator.

An electrolyte solution absorption ratio represented by the following Equation 2 may be 1.5 or more:

$$\text{Electrolyte solution absorption ratio }(A)=[A_1/A_2]\qquad \text{[Equation 2]}$$

wherein $A_1$ is an electrolyte solution absorption amount per 1 g of the polyolefin-based porous separator including the first to third porous films, $A_2$ is an electrolyte solution absorption amount per 1 g of an inorganic separator that contains a polyolefin-based resin and does not contain inorganic particles, and $A_1$ and $A_2$ are measured after dipping the polyolefin-based porous separator in an electrolyte solution at 18° C. for 60 minutes.

Embodiments may be realized by providing a method of manufacturing a polyolefin-based porous separator, the method including forming a first polyolefin-based porous film on a first surface of a second polyolefin-based porous film by melt-kneading and extruding a polyolefin-based resin composition and a plasticizer to manufacture a first cooled and solidified sheet, and forming a third polyolefin-based porous film on a second surface of the second polyolefin-based porous film by melt-kneading and extruding a polyolefin-based resin composition and the plasticizer to manufacture a second cooled and solidified sheet, each of the first and third polyolefin-based porous films containing inorganic particles having an average particle size of 10 nm to 100 nm, and a thickness ratio of the first polyolefin-based porous film, the second polyolefin-based porous film, and the third polyolefin-based porous film being 0.5 to 1.5:1 to 6:0.5 to 1.5.

Before the melt-kneading, a composition for forming the first polyolefin-based porous film and a composition for forming the third polyolefin-based porous film may be formed by pre-mixing the polyolefin-based resin compositions, the inorganic particles, and the plasticizer with each other.

The first polyolefin-based porous film, the second polyolefin-based porous film, and the third polyolefin-based porous film may be formed by co-extrusion or heat-fusion.

The method may further include stretching the solidified sheets in a machine direction and a transverse direction to form pores, and extracting the plasticizer.

The stretching may be performed under conditions including a temperature of 100° C. to 130° C., a stretching ratio in the machine direction of 4 to 10 times, and a stretching ratio in the transverse direction of 4 to 10 times.

The solidified sheets from which the plasticizer is extracted may be heat-set in at least one axis direction at 110° C. or more.

The polyolefin-based resin may be one or more of high density polyethylene (HDPE) having a viscosity average molecular weight (Mv) of 100,000 to 900,000, ultrahigh molecular weight polyethylene (UHMWPE) having a viscosity average molecular weight of 900,000 or more, or polypropylene (PP).

The second porous film may include 1 wt % to 40 wt % of the ultrahigh molecular weight polyethylene based on a total weight of a composition for forming the second porous film.

Each of the first and third porous films may include 1 wt % to 40 wt % of the ultrahigh molecular weight polyethylene based on a total weight of a composition for forming the first porous film or a composition for forming the third porous film.

One or more of the first or third porous film may include 40 wt % to 70 wt % of the inorganic particles based on a total weight of a composition for forming the first porous film or a composition for forming the third porous film.

Embodiments may be realized by providing an electrochemical battery, including a cathode, an anode, an electrolyte, and a separator interposed between the cathode and the anode, the separator being the polyolefin-based porous separator.

The electrochemical battery may be a secondary battery.

The secondary battery may be a lithium secondary battery.

DETAILED DESCRIPTION

Example embodiments will now be described more fully hereinafter; however, they may be embodied in different forms and should not be construed as limited to the embodiments set forth herein. Rather, these embodiments are provided so that this disclosure will be thorough and complete, and will fully convey exemplary implementations to those skilled in the art.

Since contents that are not described in the present specification may be sufficiently recognized and inferred by those skilled in the art or similar art, a description thereof will be omitted.

A polyolefin-based porous separator according to an exemplary embodiment may include a first polyolefin-based porous film, a second polyolefin-based porous film, and a third polyolefin-based porous film.

In the present specification, the term "polyolefin-based" porous separator refers to a separator made of a polyolefin-based resin composition.

The phrase "polyolefin-based resin composition" refers to a composition containing a polyolefin-based resin, and the composition may contain the polyolefin-based resin, for example, at a content of 50 wt % or more based on a total weight of the polyolefin-based resin composition. The polyolefin-based resin composition may contain, for example, the polyolefin-based resin, other resins (for example, polyamide (PA), polyvinylidene fluoride (PVdF), polycarbonate (PC), or polysulfone (PSF)) capable of being used together with the polyolefin-based resin except for the polyolefin-based the resin, and inorganic particles.

The second polyolefin-based porous film may be an organic porous film. The organic porous film may contain an organic polymer resin, for example, the polyolefin-based resin, and contain other additives when needed. As an example, the second porous film may not contain inorganic particles.

The first and third polyolefin-based porous films may be organic/inorganic porous films. The organic/inorganic porous film may contain the polyolefin-based resin and inorganic particles.

The first and third polyolefin-based porous films may be formed on both surfaces of the second polyolefin-based porous film, respectively, a thickness ratio of the first polyolefin-based porous film, the second polyolefin-based porous film, and the third polyolefin-based porous film may be 0.5 to 1.5:1 to 6:0.5 to 1.5, for example, 1:1 to 6:1, and the first and third polyolefin-based porous films may have the same thickness as each other.

For example, the thickness of each of the first and third polyolefin-based porous films may be 1 μm to 15 μm, for example, 1 μm to 10 μm or 2 μm to 8 μm.

The thickness of the second polyolefin-based porous film may be equal to or different from that of the first or third polyolefin-based porous film. The thickness of the second porous film may be thicker than those of the first and third porous film containing an inorganic material, and may be, for example, 1 μm to 20 μm or 2 μm to 15 μm.

In the above-mentioned range, the separator may have suitable electrolyte solution wettability and heat resistance as the separator. Changes in physical properties, such as, for example, thicknesses before and after heating and pressing and air permeability, may be minimized, deformation of the separator, for example, due to charge and discharge of a battery, may be minimized, and it may be possible to simultaneously improve high power and cycle characteristics of the battery and stability of the separator. Suitable tensile strength may be secured, a high tension high-speed winding assembling property of the battery may be secured, and it may be possible to improve productivity of the battery.

A total thickness of the polyolefin-based porous separator according to an exemplary embodiment may be 5 μm to 30 μm, for example, 5 μm to 25 μm or 10 μm to 25 μm. In the above-mentioned range, the overall strength of the separator may be maintained, and the separator may meet the desired capacity of the battery.

According to an exemplary embodiment, a film thickness change T of the polyolefin-based porous separator represented by the following Equation 1 may be 20% or less, for example, 18% or less, 16% or less, or 15% or less. In the following Equation 1, $T_1$ indicates a thickness before heating and pressing the separator, $T_2$ indicates a thickness after heating and pressing the separator at 90° C. and 2.2 MPa for 5 minutes.

$$T(\%)=[T_1-T_2]/T_1\times 100, \qquad \text{[Equation 1]}$$

In the above-mentioned range, deterioration of the cycle characteristics of the battery may be prevented, by minimizing a change in the film thickness by heat and pressure, for example, due to expansion of the separator at the time of charging electrodes.

An example of the method of measuring a film thickness change rate of the separator is as follows: Separators may each be placed between a pair of press plates having a flat surface, and heated and pressed at 90° C. and 2.2 MPa (22 kgf/cm$^2$) for 5 minutes using a press machine. Then, a film thickness may be measured using a Litematic thickness gauge (supplied by Mitutoyo Corp., product name: VL-50). A thickness before heating and pressing may be defined as $T_1$, and a thickness after heating and pressing may be defined as $T_2$, and a film thickness change T of Equation 1 may be calculated.

In an exemplary embodiment, thermal shrinkage rates of the porous separator measured in a machine direction (MD) and a transverse direction (TD), respectively, after standing at 120° C. for 1 hour may be 5% or less, for example, 4% or less or 3% or less.

Thermal shrinkage rates measured in a machine direction (MD) and a transverse direction (TD), respectively, after standing at 105° C. for 1 hour may be 0.1% or less, for example, 0.01% or less. In the above-mentioned range, resistance against thermal shrinkage of the separator generated at the time of overheating may be improved, and stability against heat may be secured.

An example of the method of measuring a thermal shrinkage rate of a separator is as follows: 10 samples may be manufactured by cutting a manufactured separator at a size of 50 mm×50 mm (length (MD)×width (TD)) at 10 different points, each of the samples may be allowed to stand in ovens at 105° C. and 120° C. for 1 hour, respectively, and then, shrinkage degrees of each of the samples in the MD and TD directions may be measured, and average thermal shrinkage rates may be calculated by reflecting the decreased sizes.

Air permeability of the porous separator may be 250 sec/100 cc or less, for example, 200 sec/100 cc or less. Air permeability measured after heating and pressing the polyolefin-based porous separator at 90° C. and 2.2 MPa for 5 minutes may be 500 sec/100 cc or less, for example, 450 sec/100 cc or less or 430 sec/100 cc or less.

In the above-mentioned range, air permeability resistance against pressure by expansion of the battery at the time of charging the battery may be increased, and cycle characteristics of the battery may be improved. Air permeability of the separator may be excellent, an electrolyte solution may be sufficiently impregnated into the separator, and performance of the battery may be improved.

An example of the method of measuring air permeability is as follows: after 5 samples are manufactured by cutting the separator at 5 different points, in each of the samples, an average time required for air (100 cc) to pass through a circular separator having a diameter of 1 inch may be measured using an air permeability tester (Asahi Seiko Co. LTD.) 5 times, then, an average value may be calculated, and air permeability may be measured.

Tensile strength of the porous separator in each of the MD direction and the TD direction may be 900 kgf/cm$^2$ or more, for example, 1,000 kgf/cm$^2$ or more or 1,100 kgf/cm$^2$. In the above-mentioned range, sufficient strength for smoothly performing a winding process may be secured.

An example of the method of measuring tensile strength of the separator is as follows: after 10 samples are manufactured by cutting a manufactured separator into a rectangle having a size of 10 mm×50 mm (length (MD)×width (TD)) at 10 different points, each of the samples may be mounted in a universal tensile machine (UTM), a measurement length may become 20 mm, then, the sample may be drawn, and average tensile strength in the MD and TD directions may be measured.

In an exemplary embodiment, an electrolyte solution absorption amount measured after dipping the polyolefin-based porous separator in an electrolyte solution at 18° C. for 60 minutes may be 300 mg or more, for example, 310 mg or more or 320 mg or more, per 1 g of the polyolefin-based porous separator.

An electrolyte solution absorption ratio A of the polyolefin-based porous separator represented by the following Equation 2, measured after dipping the polyolefin-based porous separator in the electrolyte solution at 18° C. for 60 minutes may be 1.5 or more.

Electrolyte solution absorption ratio $(A)=[A_1/A_2]$ [Equation 2]

In Equation 2, $A_1$ is an electrolyte solution absorption amount per 1 g of a polyolefin-based porous separator including first to third porous films, and $A_2$ is an electrolyte solution absorption amount per 1 g of an inorganic separator that contains a polyolefin-based resin and does not contain inorganic particles.

In the above-mentioned range, the electrolyte solution absorption rate may be improved, and high power and cycle characteristics of the battery may be realized.

An example of the method of measuring an electrolyte solution absorption amount and ratio of the polyolefin-based porous separator is as follows: each of the separators may be dipped in an electrolyte solution (electrolyte: LiBF$_4$, electrolyte concentration: 1 mol/L, solvent: polypropylene carbonate) kept warm at 18° C. for 1 hour, and an increase in mass may be investigated, and an absorption amount $A_1$ per mass of the sample [an increase amount (mg) in mass of the separator/mass (g) of the separator before absorption] may be calculated.

An electrolyte solution absorption amount $A_2$ of a polyolefin-based porous separator (for example, Comparative Example 2) that contains a polyolefin-based resin and does not contain inorganic particles may be measured by the same method as described above, and an electrolyte solution absorption ratio of each of the polyolefin-based porous separators using Equation 2 may be calculated.

The first to third polyolefin-based porous films may commonly contain a polyolefin-based resin, and as an example, the first and third polyolefin-based porous films may further contain inorganic particles.

Hereinafter, the method of manufacturing a polyolefin-based porous separator according to an exemplary embodiment will be described.

The method of manufacturing a polyolefin-based porous separator may include: forming a sheet using a polyolefin-based resin composition and a plasticizer, stretching the sheet to form pores, and extracting the plasticizer.

First, the polyolefin-based resin composition will be described.

The polyolefin-based resin composition may contain a polyolefin-based resin, and further contain inorganic particles as needed. The polyolefin-based resin composition may contain other resins capable of being used together with the polyolefin-based resin in addition to the polyolefin-based resin.

The polyolefin-based resin may be a homopolymer or copolymer. An example of the polyolefin-based resin may include polyethylene (PE), polypropylene (PP), or poly-4-methyl-1-pentene (PMP). An example of the polyolefin-based rein may include one or more of ultrahigh molecular weight polyethylene (UHMWPE), high molecular weight polyethylene (HMWPE), high density polyethylene (HDPE), low density polyethylene (LDPE), linear low density polyethylene (L-LDPE), high crystalline polypropylene (HCPP), or a polyethylene-propylene copolymer.

The polyolefin-based resin may be one or more of high density polyethylene (HDPE) having a viscosity average molecular weight (Mv) of 100,000 to 900,000, ultrahigh molecular weight polyethylene (UHMWPE) having a viscosity average molecular weight of 900,000 or more, or polypropylene (PP).

The viscosity average molecular weight (Mv) of the high density polyethylene may be 300,000 to 900,000, for example, 400,000 to 900,000 or 400,000 to 800,000.

The viscosity average molecular weight of the ultrahigh molecular weight polyethylene may be 1,000,000 or more, for example, 2,000,000 or more or 2,000,000 to 5,000,000.

Examples of other resins except for the polyolefin-based resin may include polyamide (PA), polybutylene terephthalate (PBT), polyethyleneterephthalate (PET), polychlorotrifluoroethylene (PCTFE), polyoxymethylene (POM), polyvinyl fluoride (PVF), polyvinylidene fluoride (PVdF), polycarbonate (PC), polyarylate (PAR), polysulfone (PSF), and polyetherimide (PEI). One of them may be used alone or a mixture of at least two thereof may be used.

Each of the polyolefin-based porous films of the separator may contain the high density polyethylene or the ultrahigh molecular weight polyethylene alone or contain a mixture of at least two of the high density polyethylene, the ultrahigh molecular weight polyethylene, and polypropylene, and the polyolefin-based resins contained in the first to third polyolefin-based porous films may be the same as or different from each other.

A content of the polyolefin-based resin may be measured based on a total weight of a composition for forming a porous film, containing the polyolefin-based resin composition and the plasticizer. Based on a total weight of each of the compositions for forming first and third polyolefin-based porous films, the high density polyethylene may be contained, e.g., present, at a content of 1 wt % to 50 wt %, for example, 1 wt % to 40 wt %, in each of the first and third polyolefin-based porous films. The high density polyethylene may be contained at a content of 5 wt % to 70 wt %, for example, 5 wt % to 50 wt % in the second polyolefin-based porous film. Based on the total weight of each of the compositions for forming first and third polyolefin-based porous films, the ultrahigh molecular weight polyethylene may be contained at a content of 1 wt % to 40 wt %, for example, 1 wt % to 30 wt % or 1 wt % to 20 wt % in each of the first and third polyolefin-based porous films. The ultrahigh molecular weight polyethylene may be contained at a content of 1 wt % to 40 wt %, for example, 1 wt % to 30 wt %, 1 wt % to 20 wt %, or 1 wt % to 15 wt % in the second polyolefin-based porous film In the above-mentioned range, tensile strength suitable as the separator may be maintained, deformation of the separator, for example, due to changes in, for example, heat and pressure, may be minimized, and cycle characteristics may be improved.

In an example, a polyolefin-based resin composition for forming the first and third polyolefin-based porous films may contain inorganic particles, and a polyolefin-based resin composition for forming the second porous film may not contain inorganic particles. An example of the inorganic particles may include silica ($SiO_2$), $Al_2O_3$, $TiO_2$, ZnO, MgO, $ZrO_2$, PbO, $Bi_2O_3$, $MoO_3$, $V_2O_5$, $Nb_2O_5$, $Ta_2O_5$, $WO_3$, or $In_2O_3$ particles. For example, silica or alumina may be used.

The silica or alumina may be silica or alumina obtained by a liquid phase method such as, for example a sol gel method or a precipitation method, or silica or alumina obtained by a vapor phase method such as, for example, a flame oxidation method. Fumed silica/alumina, or fused silica/alumina may be used, and the silica or alumina may have, for example, a spherical shape, a flake shape, or an edgeless shape. One or a mixture of at least two thereof may be used.

In an embodiment, as the inorganic particles, hydrophobic nanoparticles surface treated with an organic silane may be used.

An average particle size of the inorganic particles contained in the first and third polyolefin-based porous films may be 10 nm to 100 nm, for example, 10 nm to 80 nm or 10 nm to 50 nm. The inorganic particles may be contained at a content of 1 wt % to 40 wt %, for example, 1 wt % to 30 wt % or 1 wt % to 20 wt % in each of the first and third polyolefin-based porous films based on the total weight of each of the compositions for forming the first and third polyolefin-based porous films.

The "average particle size" refers to an average particle size of particles which are independently configured and observed in case that each of the particles may be dispersed or aggregated.

An example of a method of measuring the average particle size is as follows: an average particle size of particles in the separator may be confirmed using a scanning electron microscope (SEM).

Various additives, for example, an antioxidant, a heat stabilizer, a chlorine scavenger, an antistatic agent, a lubricant, an anti-blocking agent, a viscosity regulator, and a cryoprotectant, may be mixed with the composition for forming each of the porous films in a range in which the object of embodiments is not damaged.

Hereinafter, the method of manufacturing a polyolefin-based porous separator according to an exemplary embodiment will be described.

The method of manufacturing a polyolefin-based porous separator may include forming first to third polyolefin-based porous films by melt-kneading and extruding polyolefin-based resin compositions and a plasticizer to manufacture cooled and solidified sheets.

Melt-Kneading Process

As an example, as the method of melt-kneading a polyolefin-based resin composition and a plasticizer, a plurality of extruders may be used, and the composition may be kneaded by injecting the plasticizer while adding other additives to the polyolefin-based resin composition and melt-kneading the composition.

According to an exemplary embodiment, after the polyolefin-based resin composition is melt-kneaded, the plasticizer may be separately injected into an extruder, heated, and melt-kneaded.

According to an exemplary embodiment, after adding a small amount of plasticizer to a polyolefin-based resin composition and pre-mixing the plasticizer and the composition with each other using, for example, a Henschel mixer, a Banbury mixer, or a planetary mixer, before melt-kneading, the remaining plasticizer may be injected into the extruder, heated, and melt-kneaded, and an excess of plasticizer may be additionally introduced at the time of extrusion.

In the case of using powder type inorganic particles in forming the polyolefin-based resin composition, dispersibility of the inorganic particles may be improved by using a pre-mixing method, and the polyolefin-based resin composition may be easily injected into the extruder by blocking the powder from being scattered and decreasing a volume density of the inorganic particles to suppress generation of, for example, a bridge phenomenon in a hopper.

Fracture of the separator at the time of high-magnification stretching may be decreased by pre-mixing.

In an embodiment, the plasticizer capable of being used together with the polyolefin-based resin may be an organic compound forming a single phase together with the polyolefin-based resin at an extrusion temperature.

An example of the plasticizer may include aliphatic or cyclic hydrocarbons such as, for example nonan, decane, decalin, fluid paraffin (or paraffin oil) such as liquid paraffin (LP), and paraffin wax; phthalic acid esters such as, for example, dibutyl phthalate (DBP) and dioctyl phthalate (DOP); fatty acids having 10 to 20 carbon atoms such as, for example, palmitic acid, stearic acid, oleic acid, linoleic acid, and linolenic acid; and fatty acid alcohols having 10 to 20 carbon atoms such as, for example, palmitic acid alcohol, stearic acid alcohol, and oleic acid alcohol. One of them may be used alone or a mixture of at least two thereof may be used.

For example, among the plasticizers, one or more of a fluid paraffin or dioctyl phthalate may be used. A fluid paraffin may be harmless to the human body, may have a high boiling point, and may contain a small content of volatile ingredients, and a liquid paraffin may have properties suitable for being used as a plasticizer in a wet method.

A content of the plasticizer may be measured based on a total weight of the composition for forming a porous film, containing the polyolefin-based resin composition and the plasticizer.

Based on the total weight of each of the compositions for forming first to third porous films, the plasticizer may be contained at a content of 20 wt % to 90 wt %, for example, 30 wt % to 80 wt % or 40 wt % to 80 wt % in each of the first to third porous films.

Extruding and Film Forming Process

Then, the melt-kneaded compositions may be injected into the extruder to be extruded in a sheet phase, and the extruded compositions may be cooled, and solidified, and it may be possible to form a gel sheet in which the first to third polyolefin-based porous films are stacked. Physical properties of the separator may be adjusted by adjusting a thickness ratio of the first to third polyolefin-based porous films.

In an embodiment, as a method of forming the stacked gel sheet, a method of forming a gel sheet constituting each of the layers from a plurality of extruders and co-extruding the formed gel sheets at 160° C. to 250° C. through a single die, or a method of overlapping a gel sheet constituting each of the layers to heat-fuse the overlapped gel sheets, for example, may be used.

As a method of co-extrusion, a plurality of sheets formed from a plurality of extruders may be stacked in a single die by adhering the plurality of sheets in a die or using various manifold methods, or a feed block method. As the die, a flat die such as, for example, a T die or a coat hanger die, may be used.

An example of co-extrusion is as follows: the composition of each of the porous films may be fed to feeding parts of two co-rotation twin screw extruders by a metering powder feeder, and a predetermined amount of fluid paraffin may be additionally fed to a cylinder part of the twin screw extruders using a liquid injection method.

Each of the melt-kneaded materials may pass through a gear pump, a polymer filter, and a conduit set to 220° C. to be discharged to a T-die capable of co-extruding two kinds of compositions to form a three-layer sheet, followed by cooling using a roll controlled at 30° C., and a three-layer sheet including the first and third porous films as surface layers may be manufactured.

Stretching Process

Subsequently, a stretching process of the solidified sheet may be performed. In the method of manufacturing a polyolefin-based porous separator, the stretching process may be performed before extracting the plasticizer, stretching work may be more easily performed, for example, due to increased flexibility of the polyolefin-based resin by the plasticizer, and it may be possible to increase production stability.

A thickness of the sheet may be thinned by stretching, the plasticizer may be more easily removed from the sheet, and pores may be formed by stretching.

The solidified sheet may be stretched in a machine direction (MD) and/or a transverse direction (TD). The solidified sheet may be stretched in a direction of the machine direction or the transverse direction (uniaxial stretching) or be stretched in both of the machine direction and the transverse direction (biaxial stretching).

At the time of performing the biaxial stretching, the solidified sheet may be simultaneously stretched in the machine direction and the transverse direction or stretched in the machine direction (or the transverse direction) and then stretched in the transverse direction (or the machine direction).

In an embodiment, the stretching process may be performed by a biaxial stretching method, for example, a successive biaxial stretching method. In the case of using a successive biaxial stretching method, a stretching ratio in the machine direction and the transverse direction may be more easily adjusted.

A difference in stretching ratio between a gripping region and a non-gripping region by a sheet engaging apparatus may be decreased, quality uniformity of a finally stretched product may be secured, a separation phenomenon of the sheet from the sheet engaging apparatus may be prevented, and production stability may be secured. At the time of performing the stretching, a temperature and a stretching ratio may be suitably adjusted, and physical properties of a separator to be manufactured may be changed according to performed conditions.

A temperature condition of the stretching process may be 100° C. to 130° C., for example, 100° C. to 125° C. In the above-mentioned temperature range, the sheet may be stretched without fracture of the sheet.

The stretching ratio of the stretching process may be 4 times to 10 times in the machine direction and/or the transverse direction. The stretching ratio may be 4 times to 8 times in the machine direction and/or the transverse direction, and the stretching ratios in the machine direction and/or the transverse direction may be the same as or different from each other. An area magnification may be 30× or 65×.

Plasticizer Extracting Process

After the stretching, the plasticizer may be extracted. Extraction may be performed by a method of dipping the sheet stretched in the machine direction and the transverse direction in an organic solvent in a plasticizer extraction apparatus to extract the plasticizer and then drying the sheet through an air knife.

In an embodiment, the organic solvent used to extract the plasticizer may be any solvent that extracts the plasticizer. An example of the organic solvent may include halogenated hydrocarbons such as, for example, methylene chloride, 1,1,1-trichloroethane, and fluorocarbons; hydrocarbons such as, for example, n-hexane and cyclohexane; alcohols such as, for example, ethanol and isopropanol; and ketones such as, for example, acetone and 2-butanone, which may have high extraction efficiency and may be easily dried, and in the case of using fluid paraffin as the plasticizer, methylene chloride may be used as the organic solvent.

Many of the organic solvents used in an extraction process of the plasticizer may have high volatility and may be highly toxic, and to suppress volatilization of the organic solvent, water may be used.

Heat-Setting Process

A heat-setting process may be performed after extracting the plasticizer. The heat-setting process may remove residual stress of the dried sheet to decrease a thermal shrinkage rate of a final sheet, and air permeability, the thermal shrinkage rate, and strength, for example, of the separator may be adjusted according to, for example, a temperature and a setting ratio, at the time of performing the heat-setting process.

The heat-setting process may be a process of stretching and/or relaxing (shrinking) the extracted and dried sheet in at least one axial direction, and may be biaxially performed in both of the transverse and the machine directions. The heat-setting process may be a process of stretching or relaxing the sheet in both of the transverse direction and the machine direction, stretching and relaxing the sheet in both of the transverse direction and the machine direction, or stretching and relaxing the sheet in one axis direction and only stretching or relaxing in the other axial direction.

For example, in an embodiment, the heat-setting process may be a process of stretching and relaxing (shrinking) the sheet in the transverse direction. The heat-setting process may be performed by a method of performing the stretching in the transverse direction and relaxing the transversely stretched sheet again in the transverse direction. Strength of the separator may be improved by the heat-setting process of stretching and relaxing the sheet, the thermal shrinkage rate of the separator may be improved, and heat resistance may be improved.

The sheet may be heat-set, and a width of the sheet in the transverse direction may be increased to 1.1 times to 2.0 times, for example, 1.2 times to 1.6 times based on a width of the sheet before heat-setting the sheet. The sheet may be stretched, and the width of the sheet in the transverse direction may be increased to 1.1 times to 2.0 times, and then, the stretched sheet may be relaxed again, and the width of the sheet may become 0.8 times to 1.6 times. In the above-mentioned stretching ratio range, thermal and mechanical properties of the separator may be secured.

At the time of heat-setting, a temperature condition may be suitably adjusted in various temperature ranges, and physical properties of a separator to be manufactured may be changed according to the temperature conditions.

A temperature at the time of heat-setting (transverse stretching and/or transverse shrinkage) according to the present aspect may be 110° C. or more, for example, 110° C. to 135° C., 120° C. to 135° C., or 125° C. to 135° C. The heat-setting may be performed in the above-mentioned temperature range, and the shrinkage rate of the separator may be controlled.

The heat-setting may be performed using a tenter, and the transverse stretching and/or transverse relaxation may be appropriately repeatedly performed one time or more according to, for example, strength and a thermal shrinkage rate, of the desired separator.

An electrochemical battery according to an exemplary embodiment may include a polyolefin-based porous separator, a cathode, and an anode, and may be filled with an electrolyte. The polyolefin-based porous separator may be a separator according to the above-mentioned exemplary embodiment or a separator manufactured according to an exemplary embodiment.

The electrochemical battery may be a lithium secondary battery such as, for example, a lithium metal secondary battery, a lithium ion secondary battery, a lithium polymer secondary battery, or a lithium ion polymer secondary battery. An example of the method of manufacturing the electrochemical battery is as follows: the battery may be manufactured by positioning an exemplary polyolefin-based porous separator according between the cathode and the anode of the battery and filling the electrolyte solution therein.

Electrodes constituting the electrochemical battery may be manufactured in a shape in which electrode active materials are adhered to electrode current collectors by a method used in the art. Among the electrode active a cathode active material used in the art may be used.

Examples of the cathode active material may include a lithium manganese oxide, a lithium cobalt oxide, a lithium nickel oxide, a lithium iron oxide, or a lithium complex oxide obtained by a combination thereof.

Among the electrode active materials, an anode active material used in the art may be used.

Examples of the anode active material may include a lithium adsorption material such as a lithium metal or lithium alloy, carbon, a petroleum coke, activated carbon, graphite, or other carbons.

An electrode current collector used in the art may be used. Examples of a material of a cathode current collector among the electrode current collectors may include aluminum, nickel, or foil manufactured by a combination thereof. Examples of a material of an anode current collector among the electrode current collectors may include copper, gold, nickel, a copper alloy, or foil manufactured by a combination of aluminum and nickel.

An electrolyte solution for an electrochemical battery used in the art may be used. The electrolyte solution may be an electrolyte solution in which a salt having a structure such as $A^+B^-$ is dissolved or dissociated in an organic solvent.

An example of $A^+$ may include an alkali metal cation such as $Li^+$, $Na^+$, or $K^+$, or a cation obtained by a combination thereof.

An example of B may include an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or an anion obtained by a combination thereof.

An example of the organic solvent may include propylene carbonate (PC), ethylene carbonate (EC), diethyl carbonate (DEC), dimethyl carbonate (DMC), dipropyl carbonate (DPC), dimethyl sulfoxide (DMSO), acetonitrile, dimethoxyethane, diethoxyethane, tetrahydrofuran (THF), N-methyl-2-pyrrolidone (NMP), ethyl methyl carbonate (EMC), or γ-Butyrolactone (GBL). One of them may be used alone or a mixture of at least two thereof may be used.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Preparation of Polyolefin-Based Resin Composition for Forming First and Third Porous Films (Inorganic Material Containing Layers)

After powder type raw materials composed of 13 wt % of high density polyethylene (HDPE) having a viscosity average molecular weight (Mv) of 600,000, 6 wt % of ultrahigh molecular weight polyethylene (UHMWPE) having a viscosity average molecular weight (Mv) of 2,400,000, 13 wt % of silica hydrophobized with dimethyldichlorosilane and having an average particle size of 15 nm, and 0.1 wt % of antioxidant (Irganox 1010, BASF) were put into and mixed in a Henschel mixer for 1 minute, 15.4 wt % of fluid paraffin was additionally added thereto, followed by pre-mixing for 1 minute 30 seconds, thereby preparing a polyolefin-based resin composition.

Preparation of Polyolefin-Based Resin Composition for Forming Second Porous Film (Inorganic Material-Free Layer)

After 25.5 wt % of high density polyethylene (HDPE) having a viscosity average molecular weight (Mv) of 600,000, 4.5 wt % of ultrahigh molecular weight polyethylene (UHMWPE) having a viscosity average molecular weight (Mv) of 2,400,000, and 0.1 wt % of antioxidant (Irganox 1010, BASF) were put into and pre-mixed in a Henschel mixer, thereby preparing the polyolefin-based resin composition.

Manufacturing of Separator

Each of the compositions was fed to feeding parts of two co-rotation twin screw extruders by a metering powder feeder.

The polyolefin-based resin composition for forming first and third porous films was first fed to a feeding part of one extruder through the feeder, and 52.5 wt % of fluid paraffin was additionally injected into a cylinder part of the twin screw extruders using a liquid injection method so that a total content of the fluid paraffin became 67.9 wt % based on a total weight of the composition for forming first and third porous films.

The polyolefin-based resin composition for forming a second porous film was first fed to a feeding part of the other extruder through the feeder, and 69.9 wt % of fluid paraffin was additionally injected into a cylinder part of the twin screw extruders using a liquid injection method so that a total content of the fluid paraffin became 69.9 wt % based on a total weight of the composition for forming a second porous film.

Melt-kneading in the extruder into which the polyolefin-based composition for forming first and third porous films was injected performed under conditions at which a setting temperature of the extruder was 230° C., a screw rpm was 200 rpm, and a discharge amount was 8 kg/hr, and raw materials of the second porous film were melt-kneaded under conditions at which a setting temperature of the extruder was 230° C., a screw rpm was 250 rpm, and a discharge amount was 10 kg/hr.

Each of the melt-kneaded materials passed through a gear pump, a polymer filter, and a conduit set to 220° C. to thereby be discharged to a T-die capable of co-extruding two kinds of compositions to form a three-layer sheet, followed by cooling using a roll controlled at 30° C., thereby manufacturing a three-layer sheet including the first and third porous films as surface layers and having a thickness of 1,300 μm.

Next, the manufactured sheet was stretched 6 times in a machine direction at 110° C. using an MDO apparatus, which is a roll stretching machine, induced into a tenter stretching machine, and then, stretched 6 times in a transverse direction at 125° C.

Thereafter, the stretched sheet was moved to an extractor, sufficiently dipped in methylene chloride to extract and remove the fluid paraffin, and then dried.

Next, the dried sheet was induced into a heat-setting tenter, stretched 1.4 times in the transverse direction at 130° C., and then, relaxed so that a stretching ratio at a final outlet became 1.2 times, followed by winding. Then, a separator of Example 1, having a total thickness of 18 μm was manufactured by adjusting thicknesses first and third organic/inorganic porous films to 4.5 μm and a thickness of a second organic porous film to 9 μm.

Example 2

A polyolefin-based porous separator of Example 2 was manufactured under the same conditions as in Example 1 except for preparing the compositions for forming first to third porous films so as to have ingredients and contents as illustrated in Table 1.

Example 3

A polyolefin-based porous separator of Example 3 was manufactured under the same conditions as in Example 1 except for preparing the compositions for forming first to third porous films so as to have ingredients and contents as illustrated in Table 1.

Example 4

A polyolefin-based porous separator of Example 4 was manufactured under the same conditions as in Example 1 except for preparing the compositions for forming first to third porous films so as to have ingredients and contents as illustrated in Table 1 and performing the heat-setting at 127° C.

Example 5

A polyolefin-based porous separator of Example 5 was manufactured under the same conditions as in Example 1 except for preparing the compositions for forming first to third porous films so as to have ingredients and contents as illustrated in Table 2 and adjusting each of the layers as illustrated in Table 2.

Example 6

A polyolefin-based porous separator of Example 6 was manufactured under the same conditions as in Example 1 except for preparing the compositions for forming first to third porous films so as to have ingredients and contents as illustrated in Table 2 and adjusting a thickness of each of the layers as illustrated in Table 2.

Example 7

A polyolefin-based porous separator of Example 7 was manufactured under the same conditions as in Example 1 except for preparing the compositions for forming first to third porous films so as to have ingredients and contents as illustrated in Table 2 and adjusting a thickness of each of the layers as illustrated in Table 2.

Example 8

A polyolefin-based porous separator of Example 8 was manufactured under the same conditions as in Example 1 except for preparing the compositions for forming first to third porous films so as to have ingredients, contents, and thicknesses as illustrated in Table 2 and performing the heat-setting at 127° C.

Comparative Example 1

A polyolefin-based porous separator of Comparative Example 1 was manufactured under the same conditions as in Example 1 except for manufacturing a separator having a total thickness of 18 μm using the compositions for forming first and third porous films without including a second porous film.

Comparative Example 2

A polyolefin-based porous separator of Comparative Example 2 was manufactured under the same conditions as in Example 1 except for manufacturing a separator having a total thickness of 18 μm using the composition for forming a second porous film, without including the first and third porous films.

Comparative Example 3

A polyolefin-based porous separator of Comparative Example 3 was manufactured under the same conditions as in Example 1 except for preparing the compositions for forming first to third porous films so as to have ingredients, contents, and thicknesses as illustrated in Table 2.

Comparative Example 4

A polyolefin-based porous separator of Comparative Example 4 was manufactured under the same conditions as in Example 1 except for preparing the compositions for forming first to third porous films so as to have ingredients, contents, and thicknesses as illustrated in Table 2.

Ingredients and process conditions used in Examples 1 to 8 and Comparative Examples 1 to 4 were illustrated in the following Tables 1 and 2.

TABLE 1

| Classification | | | | Example 1 | Example 2 | Example 3 | Example 4 | Comparative Example 1 | Comparative Example 2 |
|---|---|---|---|---|---|---|---|---|---|
| Ingredients | Intermediate Layer | Polyolefin-based Resin | HDPE | Mv 600,000 (25.5 wt %) | Mv 600,000 (25.5 wt %) | Mv 600,000 (25.5 wt %) | Mv 600,000 (24 wt %) | Mv 600,000 (13 wt %) | Mv 600,000 (25.5 wt %) |
| | | | UHMWPE | Mv 2,400,000 (4.5 wt %) | Mv 2,400,000 (4.5 wt %) | Mv 2,400,000 (4.5 wt %) | Mv 2,400,000 (6 wt %) | Mv 2,400,000 (6 wt %) | Mv 2,400,000 (4.5 wt %) |
| | | Antioxidant | | 0.1 wt % | 0.1 wt % | 0.1 wt % | 0.1 wt % | 0.1 wt % | 0.1 wt % |
| | | Inorganic Material | | — | — | — | — | $SiO_2$ (13 wt %) | — |
| | | Fluid Paraffin (LP) | | 69.9 wt % | 69.9 wt % | 69.9 wt % | 69.9 wt % | 67.9 wt % | 69.9 wt % |
| | Surface Layer | Polyolefin-based Resin | HDPE | Mv 600,000 (13 wt %) | | Mv 600,000 (13 wt %) | Mv 600,000 (12 wt %) | — | — |
| | | | UHMWPE | Mv 2,400,000 (6 wt %) | Mv 2,400,000 (19 wt %) | Mv 2,400,000 (6 wt %) | Mv 2,400,000 (6 wt %) | — | — |
| | | | PP | | | | Mv 60,000 (1 wt %) | | |
| | | Antioxidant | | 0.1 wt % | 0.1 wt % | 0.1 wt % | 0.1 wt % | — | — |
| | | Inorganic Material | | $SiO_2$ (13 wt %) | $SiO_2$ (13 wt %) | $Al_2O_3$ (13 wt %) | $SiO_2$ (13 wt %) | — | — |
| | | Fluid Paraffin (LP) | | 67.9 wt % | 67.9 wt % | 67.9 wt % | 67.9 wt % | — | — |
| Entire Film Thickness (of Multilayer Film) | | | | 18 μm | 18 μm | 18 μm | 18 μm | 18 μm | 18 μm |
| Sum of thicknesses of Inorganic Material Containing Layers (Surface Layers) | | | | 9 μm (4.5 + 4.5) | 9 μm (4.5 + 4.5) | 9 μm (4.5 + 4.5) | 9 μm (4.5 + 4.5) | 18 μm (Monolayer) | 0 μm |
| Thickness of Inorganic Material-free Layer (internal Layer) | | | | 9 μm | 9 μm | 9 μm | 9 μm | 0 μm | 18 μm |
| Thickness Ratio (First Porous Film:Second Porous Film:Third Porous Film) | | | | 1:2:1 | 1:2:1 | 1:2:1 | 1:2:1 | Only Inorganic Layer | Only Organic Layer |
| Stretching | | Stretching Method | | Successive Stretching | Successive Stretching | Successive Stretching | Successive Stretching | Successive Stretching | Successive Stretching |
| | | Stretching Magnification | | 6 × 6 | 6 × 6 | 6 × 6 | 6 × 6 | 6 × 6 | 6 × 6 |
| Heat-Setting | | Transverse Stretching Ratio | | 1.0→1.4→1.2 | 1.0→1.4→1.2 | 1.0→1.4→1.2 | 1.0→1.4→1.2 | 1.0→1.4→1.2 | 1.0→1.4→1.2 |
| | | Temperature | | 130° C. | 130° C. | 130° C. | 130° C. | 130° C. | 127° C. |

TABLE 2

| Classification | | | | Example 5 | Example 6 | Example 7 | Example 8 | Comparative Example 3 | Comparative Example 4 |
|---|---|---|---|---|---|---|---|---|---|
| Ingredients | Intermediate Layer | Polyolefin-based Resin (PO) | HDPE | Mv 600,000 (25.5 wt %) | Mv 600,000 (25.5 wt %) | Mv 600,000 (25.5 wt %) | Mv 600,000 (25.5 wt %) | Mv 600,000 (25.5 wt %) | Mv 600,000 (25.5 wt %) |
| | | | UHMWPE | Mv 2,400,000 (4.5 wt %) | Mv 2,400,000 (4.5 wt %) | Mv 2,400,000 (4.5 wt %) | Mv 2,400,000 (4.5 wt %) | Mv 2,400,000 (4.5 wt %) | Mv 2,400,000 (4.5 wt %) |
| | | Antioxidant | | 0.1 wt % | 0.1 wt % | 0.1 wt % | 0.1 wt % | 0.1 wt % | 0.1 wt % |
| | | Fluid Paraffin (LP) | | 69.9 wt % | 69.9 wt % | 69.9 wt % | 69.9 wt % | 69.9 wt % | 69.9 wt % |
| | Surface Layer | Polyolefin-based Resin | HDPE | Mv 600,000 (13 wt %) | Mv 600,000 (13 wt %) | Mv 600,000 (13 wt %) | Mv 600,000 (13 wt %) | Mv 600,000 (13 wt %) | Mv 600,000 (13 wt %) |
| | | | UHMWPE | Mv 2,400,000 (6 wt %) | Mv 2,400,000 (6 wt %) | Mv 2,400,000 (6 wt %) | Mv 2,400,000 (6 wt %) | Mv 2,400,000 (6 wt %) | Mv 2,400,000 (6 wt %) |
| | | Antioxidant | | 0.1 wt % | 0.1 wt % | 0.1 wt % | 0.1 wt % | 0.1 wt % | 0.1 wt % |
| | | Inorganic Material | | $SiO_2$ (13 wt %) | $SiO_2$ (13 wt %) | $Al_2O_3$ (13 wt %) | $Al_2O_3$ (13 wt %) | $SiO_2$ (13 wt %) | $Al_2O_3$ (13 wt %) |
| | | Fluid Paraffin (LP) | | 67.9 wt % | 67.9 wt % | 67.9 wt % | 67.9 wt % | 67.9 wt % | 67.9 wt % |
| Entire Film Thickness (of Multilayer Film) | | | | 18 μm | 18 μm | 18 μm | 18 μm | 18 μm | 18 μm |
| Sum of thicknesses of Inorganic Material Containing Layers (Surface Layers) | | | | 12 μm (6 + 6) | 6 μm (3 + 3) | 12 μm (6 + 6) | 6 μm (3 + 3) | 4 μm (2 + 2) | 4 μm (2 + 2) |
| Thickness of Inorganic Material-free Layer (internal Layer) | | | | 6 μm | 12 μm | 6 μm | 12 μm | 14 μm | 14 μm |

TABLE 2-continued

| Classification | | Example 5 | Example 6 | Example 7 | Example 8 | Comparative Example 3 | Comparative Example 4 |
|---|---|---|---|---|---|---|---|
| Thickness Ratio (First Porous Film:Second Porous Film:Third Porous Film) | | 1:1:1 | 1:4:1 | 1:1:1 | 1:4:1 | 1:7:1 | 1:7:1 |
| Stretching | Stretching Method | Successive Stretching | Successive Stretching | Successive Stretching | Successive Stretching | Successive Stretching | Successive Stretching |
| | Stretching Magnification | 6 × 6 | 6 × 6 | 6 × 6 | 6 × 6 | 6 × 6 | 6 × 6 |
| Heat-Setting | Transverse Stretching Ratio | 1.0→1.4→1.2 | 1.0→1.4→1.2 | 1.0→1.4→1.2 | 1.0→1.4→1.2 | 1.0→1.4→1.2 | 1.0→1.4→1.2 |
| | Temperature | 130° C. | 130° C. | 130° C. | 130° C. | 130° C. | 127° C. |

Experimental Example 1

Measurement of Air Permeability of Separator

After manufacturing 5 samples by cutting each of the separators manufactured in the Examples and the Comparative Examples at 5 different points so as to have a size capable of accommodating a circle having a diameter of 1 inch, time required for air (100 cc) to pass through the separator was measured in each of the samples using an air permeability tester (Asahi Seiko Co. Ltd.). The time was measured 5 times, respectively, and an average value thereof was calculated, thereby measuring air permeability.

Experimental Example 2

Measurement of Puncture Strength of Separator

After manufacturing 3 samples by cutting each of the separators manufactured in the Examples and the Comparative Examples at 3 different points at a size of 50 mm×50 mm (length (MD)×width (TD)), the samples were put on a 10 cm hole using a KATO tech KES-G5 machine, and then, puncture strength was measured while pressing the samples with a probe (1 mm). Puncture strength of each of the samples was measured 3 times, respectively, and then, an average value thereof was calculated.

Experimental Example 3

Measurement of Tensile Strength of Separator

After manufacturing 10 samples by cutting each of the separators manufactured in the Examples and the Comparative Examples into a rectangle having a size of 10 mm×50 mm (length (MD)×width (TD)) at 10 different points, each of the samples was mounted in a universal tensile machine (UTM) so that a measurement length became 20 mm, and then, the sample was drawn, thereby measuring average tensile strength in the MD and TD directions.

Experimental Example 4

Measurement of Thermal Shrinkage Rate of Separator

Ten samples were manufactured by cutting each of the separators manufactured in the Examples and the Comparative Examples at a size of 50 mm×50 mm (length (MD)×width (TD)) at 10 different points. After measuring shrinkage degrees of each of the samples in the MD and TD directions after allowing each of the samples to stand in an oven at 105° C. for 1 hour and shrinkage degrees of each of the samples in the MD and TD directions after allowing each of the samples to stand in an oven at 120° C. for 1 hour, an average thermal shrinkage rate was calculated by reflecting a decreased size.

Experimental Example 5

Film Thickness Change Rate and Air Permeability after Heating and Pressing

Each of the separators manufactured in the Examples and the Comparative Examples was placed between a pair of press plates having a flat surface, and heated and pressed at 90° C. and 2.2 Mpa (22 kgf/cm$^2$) for 5 minutes using a press machine. Then, a film thickness was measured using a Litematic thickness gauge (supplied by Mitutoyo Corp., product name: VL-50). A thickness before heating and pressing was defined as $T_1$, and a thickness after heating and pressing was defined as $T_2$, such that a film thickness change T of Equation 1 after heating and pressing was calculated.

$$T(\%)=[T_1-T_2]/T_1\times100, \quad \text{[Equation 1]}$$

Air permeability of the heated and pressured separator under the above-mentioned conditions was measured by the method as disclosed in the air permeability category.

Experimental Example 6

Electrolyte Solution Absorption Amount and Electrolyte Solution Absorption Ratio Each of the separators manufactured in the Examples and the Comparative Examples was dipped in an electrolyte solution (electrolyte: LiBF$_4$, electrolyte concentration: 1 mol/L, solvent: polypropylene carbonate) kept warm at 18° C. for 1 hour, and an increase in mass was investigated, such that an absorption amount $A_1$ per mass of the sample [an increase amount (mg) in mass of the separator/mass (g) of the separator before absorption] was calculated.

A ratio of the electrolyte solution absorption amount to an electrolyte solution absorption amount of the separator of Comparative Example 2 composed of the second organic porous film without including the first and third porous films was calculated as an electrolyte solution absorption ratio A of the polyolefin-based porous separator.

$$\text{Electrolyte solution absorption ratio }(A)=[A_1/A_2] \quad \text{[Equation 2]}$$

In Equation 2, $A_1$ is an electrolyte solution absorption amount per 1 g of the polyolefin-based porous separator including the first to third porous films, and $A_2$ is an electrolyte solution absorption amount per 1 g of a single-layer inorganic separator that contains a polyolefin-based resin but does not contain inorganic particles.

Measurement results according to Experimental Examples 1 to 6 are illustrated in the following Tables 3 and 4.

TABLE 3

|  |  | Example 1 | Example 2 | Example 3 | Example 4 | Comparative Example 1 | Comparative Example 2 |
|---|---|---|---|---|---|---|---|
| Air Permeability (sec/100 cc) | | 143 | 132 | 164 | 151 | 76 | 304 |
| Puncture strength (gf) | | 725 | 788 | 778 | 745 | 514 | 681 |
| Tensile Strength | MD | 1,333 | 1,532 | 1,344 | 1,235 | 859 | 2,220 |
| ($kgf/cm^2$) | TD | 1,298 | 1,505 | 1,300 | 1,202 | 843 | 2,122 |
| Thermal Shrinkage | MD | 0.0% | 0.0% | 0.0% | 0.0% | 0.0% | 2.0% |
| Rate (105° C., 1 hr) | TD | 0.0% | 0.0% | 0.0% | 0.0% | 0.0% | 0.0% |
| Thermal Shrinkage | MD | 3.0% | 2.5% | 3.0% | 3.0% | 2.5% | 9.0% |
| Rate (120° C., 1 hr) | TD | 3.0% | 2.5% | 3.0% | 3.0% | 2.0% | 8.0% |
| Electrolyte Solution Absorption Amount per Sample Mass (mg/g) | | 479.6 | 523.2 | 392.4 | 501.4 | 545.1 | 218.0 |
| Electrolyte Solution Absorption Ratio | | 2.2 | 2.4 | 1.8 | 2.3 | 2.5 | 1.0 |
| Film Thickness Change rate (%) after Heating and Pressing | | 7.2 | 5.5 | 11.1 | 8.3 | 5.5 | 22.0 |
| Air Permeability (sec/100 cc) after Heating and Pressing | | 250 | 221 | 318 | 267 | 109 | 780 |

TABLE 4

|  |  | Example 5 | Example 6 | Example 7 | Example 8 | Comparative Example 3 | Comparative Example 4 |
|---|---|---|---|---|---|---|---|
| Air Permeability (sec/100 cc) | | 121 | 156 | 144 | 195 | 262 | 288 |
| Puncture strength (gf) | | 582 | 884 | 600 | 895 | 944 | 956 |
| Tensile Strength | MD | 1,103 | 1,832 | 1,144 | 1,985 | 2,059 | 2,020 |
| ($kgf/cm^2$) | TD | 1,101 | 1,805 | 1,123 | 1,942 | 2,043 | 2,002 |
| Thermal Shrinkage | MD | 0.0% | 0.0% | 0.0% | 0.0% | 0.0% | 0.5% |
| Rate (105° C., 1 hr) | TD | 0.0% | 0.0% | 0.0% | 0.0% | 0.0% | 0.0% |
| Thermal Shrinkage | MD | 2.0% | 3.0% | 2.0% | 3.0% | 3.5% | 4.5% |
| Rate (120° C., 1 hr) | TD | 2.0% | 3.0% | 2.0% | 3.0% | 4.0% | 4.0% |
| Electrolyte Solution Absorption Amount per Sample Mass (mg/g) | | 675.8 | 414.2 | 566.8 | 327.0 | 305.2 | 261.6 |
| Electrolyte Solution Absorption Ratio | | 3.1 | 1.9 | 2.6 | 1.5 | 1.4 | 1.2 |
| Film Thickness Change rate (%) after Heating and Pressing | | 5.5 | 12.8 | 6.7 | 15.0 | 17.8 | 20.0 |
| Air Permeability (sec/100 cc) after Heating and Pressing | | 208 | 320 | 261 | 412 | 523 | 573 |

Referring to Tables 3 and 4, in a case of a multilayer structure in which first and third porous films containing an inorganic material are formed on both surfaces of a second porous film, as in Examples 1 to 8, the desired air permeability, tensile strength, puncture strength, thermal shrinkage rate, electrolyte solution absorption amount, and electrolyte solution absorption ratio may be secured, a film thickness change rate after heating and pressure may be small, air permeability may be improved, and at the time of applying the separator to a battery, stability against heat may be further secured.

In Comparative Example 1, having an inorganic single layer structure, other physical properties except for air permeability, a thermal shrinkage rate, and electrolyte solution absorption were poor as compared to the Examples, and in Comparative Example 2, having an organic single layer structure, physical properties except for strength were poor, and it may be difficult to simultaneously satisfy various physical properties.

In a case in which the thickness ratio of the first porous film, the second porous film, and the third porous film is in a range of 0.5 to 1.5:1 to 6:0.5 to 1.5, as in Examples 1 to 8, the various desired physical properties may be simultaneously secured.

In the case in which the thickness ratio of each of the porous films according to embodiments was not satisfied, as in Comparative Examples 3 and 4, the film thickness change rate after heating and pressing as well as the thermal shrinkage rate at 120° C. were significantly large, and an air permeability value after heating and pressing was increased, high power and cycle characteristics of a battery were deteriorated, and stability against heat was decreased.

By way of summation and review, an organic/inorganic composite separator for improving heat resistance of the separator by coating a mixture of inorganic particles and an organic binder on at least one surface of a polyolefin-based porous base film may present a short-circuit between a cathode and an anode, for example, due to shrinkage at the time of overheating and puncture of a separator.

A separator including an organic/inorganic composite coating layer may improve heat resistance as compared to a monolayer separator formed of a polyolefin-based base film, but since a heat resistant polymer organic binder used in the coating layer may have weak strength as compared to a polyolefin-based resin and may be a heterogeneous binder different from the base film, the adhesive strength to the base film may be limited.

The polyolefin-based resin may have an advantage in terms of an increase in strength, but the polyolefin-based resin may not be dissolved in an organic solvent at room temperature and may have poor heat resistance, and it may be difficult to apply the polyolefin-based resin to a coating layer. In the case of increasing an exposure time to heat to improve a thermal shrinkage rate of a base film containing the polyolefin-based resin, thermal shrinkage of the polyolefin-based base film may be severe at a high temperature, for example, due to a limitation in a melting temperature thereof, physical durability thereof may be weak, and productivity of the separator may be deteriorated.

Provided is a separator that may be capable of simultaneously satisfying suitable strength and heat resistance.

Provided is a separator that may exhibit excellent electrolyte solution absorption amount and air permeability, suitable strength, and improved thermal shrinkage rate without forming an organic/inorganic coating layer.

Provided is a high power battery that may exhibit improved stability and cycle characteristics by a separator having a suitable tensile strength and thickness as a separator while securing electrolyte solution wettability and heat resistance.

Provided is a separator that may include a plurality of polyolefin-based porous films to have suitable strength as the separator and improve air permeability, electrolyte solution wettability, and heat resistance, and that may be capable of improving a thermal shrinkage rate and air permeability by adjusting ingredients, a content, and a thickness ratio of each of the polyolefin-based porous films.

The porous separator according to an exemplary embodiment may have suitable tensile strength, and the separator may have sufficient adhesive strength to the electrode and heat resistance of the separator may be improved.

The molecular weight and content of the polyolefin-based resin contained in each of the layers may be adjusted, strength may be improved as compared to the existing separator fabric, and porous layers containing a homogeneous polymer are stacked, and adhesive force between each of the layers may be further improved.

In the separator including a plurality of porous films stacked therein according to an exemplary embodiment, tensile strength and heat resistance may be improved, high tension high-speed winding assembling property of the battery may be secured, and it may be possible to improve productivity and stability of the battery. Deformation of the separator, for example, due to charge and discharge of the battery, may be decreased by suitably adjusting a thickness of each of the layers to secure electrolyte solution permeability and minimize changes in physical properties before and after heating and pressing, and the cycle characteristics of the battery may be improved and the battery may have high power.

The polyolefin-based resin may be used instead of a heat resistant binder resin, the separator may be usefully used in a field requiring a predetermined level of strength without requiring a high level of heat resistance, the separator may have suitable strength and heat resistance without a separate coating process, and the process may be simplified.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polyolefin-based porous separator, comprising:
a first polyolefin-based porous film on a first surface of a second polyolefin-based porous film, and a third polyolefin-based porous film on a second surface of the second polyolefin-based porous film,
each of the first and third polyolefin-based porous films containing inorganic particles, an average particle size of all the inorganic particles in the first and third polyolefin-based porous films being 10 nm to 100 nm,
wherein each of the first to third polyolefin-based porous films includes a polyolefin-based resin comprising high density polyethylene (HDPE) having a viscosity average molecular weight (Mv) of 100,000 to 900,000 and ultrahigh molecular weight polyethylene (UHMWPE) having a viscosity average molecular weight of 900,000 or more,
wherein each of the first and third porous films includes 18.7 wt % to 59.2 wt % of the ultrahigh molecular weight polyethylene based on a total weight of each of the first and third porous films,
wherein the second porous film includes 15 wt % to 20 wt % of the ultrahigh molecular weight polyethylene based on a total weight of the second porous film,
wherein a thickness ratio of the first polyolefin-based porous film, the second polyolefin-based porous film, and the third polyolefin-based porous film being 0.5 to 1.5:1 to 6:0.5 to 1.5,
wherein thermal shrinkage rates of the separator in a machine direction and a transverse direction measured after standing at 120° C. for 1 hour each being 5% or less, and air permeability of the separator being 250 sec/100 cc or less, and
wherein one or more of the first and third porous films includes 40 wt % to 70 wt % of the inorganic particles based on a total weight of a composition for forming the first porous film or a composition for forming the third porous film.

2. The polyolefin-based porous separator as claimed in claim 1, wherein each of the first to third polyolefin-based porous films includes pores caused by stretching.

3. The polyolefin-based porous separator as claimed in claim 1, wherein a thickness change T represented by the following Equation 1 is 20% or less:

$$T(\%)=[T_1-T_2]/T_1\times 100, \quad \text{[Equation 1]}$$

wherein $T_1$ is a thickness of the polyolefin-based porous separator before heating and pressing, and $T_2$ is a thickness of the polyolefin-based porous separator after heating and pressing at 90° C. and 2.2 MPa for 5 minutes.

4. The polyolefin-based porous separator as claimed in claim 1, wherein air permeability measured after heating and pressing the polyolefin-based porous separator at 90° C. and 2.2 MPa for 5 minutes is 500 sec/100 cc or less.

5. The polyolefin-based porous separator as claimed in claim 1, wherein:
tensile strength of the polyolefin-based porous separator in each of the machine direction and the transverse direction is 900 kgf/cm$^2$ or more, and
a thermal shrinkage rate measured in each of the machine direction and the transverse direction after standing at 105° C. for 1 hour is 0.1% or less.

6. The polyolefin-based porous separator as claimed in claim 1, wherein an electrolyte solution absorption amount measured after dipping the polyolefin-based porous separator in an electrolyte solution at 18° C. for 60 minutes is 300 mg or more per 1 g of the polyolefin-based porous separator.

7. The polyolefin-based porous separator as claimed in claim 1, wherein an electrolyte solution absorption ratio represented by the following Equation 2 is 1.5 or more:

$$\text{Electrolyte solution absorption ratio}(A)=[A_1/A_2] \quad \text{[Equation 2]}$$

wherein $A_1$ is an electrolyte solution absorption amount per 1 g of the polyolefin-based porous separator including the first to third porous films, $A_2$ is an electrolyte solution absorption amount per 1 g of an inorganic separator that contains a polyolefin-based resin and does not contain inorganic particles, and $A_1$ and $A_2$ are measured after dipping the polyolefin-based porous separator in an electrolyte solution at 18° C. for 60 minutes.

8. An electrochemical battery, comprising:
a cathode,
an anode,
an electrolyte, and
a separator interposed between the cathode and the anode, the separator being the polyolefin-based porous separator as claimed in claim 1.

9. The electrochemical battery as claimed in claim 8, wherein the electrochemical battery is a secondary battery.

10. The electrochemical battery as claimed in claim 9, wherein the secondary battery is a lithium secondary battery.

11. A method of manufacturing a polyolefin-based porous separator, the method comprising:
forming a first polyolefin-based porous film on a first surface of a second polyolefin-based porous film by melt-kneading and extruding a polyolefin-based resin composition and a plasticizer to manufacture a first cooled and solidified sheet, and
forming a third polyolefin-based porous film on a second surface of the second polyolefin-based porous film by melt-kneading and extruding a polyolefin-based resin composition and the plasticizer to manufacture a second cooled and solidified sheet,
each of the first and third polyolefin-based porous films containing inorganic particles, an average particle size of all the inorganic particles in the first and third polyolefin-based porous films being 10 nm to 100 nm,
wherein one or more of the first or third porous film includes 40 wt % to 70 wt % of the inorganic particles based on a total weight of a composition for forming the first porous film or a composition for forming the third porous film a thickness ratio of the first polyolefin-based porous film, the second polyolefin-based porous film, and the third polyolefin-based porous film being 0.5 to 1.5:1 to 6:0.5 to 1.5,
wherein each of the first to third polyolefin-based porous films comprises a polyolefin-based resin comprising high density polyethylene (HDPE) having a viscosity average molecular weight (Mv) of 100,000 to 900.000 and ultrahigh molecular weight polyethylene (UHMWPE) having a viscosity average molecular weight of 900,000 or more,
wherein each of the first and third odorous films includes 18.7 wt % to 59.2 wt % of the ultrahigh molecular weight polyethylene based on a total weight of each of the first and third porous films, and
wherein the second porous film includes 15 w/t % to 20 w/t % of the ultrahigh molecular weight polyethylene based on a total weight of the second porous film.

12. The method as claimed in claim 11, wherein before the melt-kneading, a composition for forming the first polyolefin-based porous film and a composition for forming the third polyolefin-based porous film are formed by pre-mixing the polyolefin-based resin compositions, the inorganic particles, and the plasticizer with each other.

13. The method as claimed in claim 11, wherein the first polyolefin-based porous film, the second polyolefin-based porous film, and the third polyolefin-based porous film are formed by co-extrusion or heat-fusion.

14. The method as claimed in claim 11, further comprising:
stretching the solidified sheets in a machine direction and a transverse direction to form pores, and
extracting the plasticizer.

15. The method as claimed in claim 14, wherein the stretching is performed under conditions including a temperature of 100° C. to 130° C., a stretching ratio in the machine direction of 4 to 10 times, and a stretching ratio in the transverse direction of 4 to 10 times.

16. The method as claimed in claim 14, wherein the solidified sheets from which the plasticizer is extracted are heat-set in at least one axis direction at 110° C. or more.

* * * * *